(12) United States Patent
Oyama et al.

(10) Patent No.: US 10,280,524 B2
(45) Date of Patent: May 7, 2019

(54) OZONE WATER MANUFACTURING DEVICE

(71) Applicant: WATER AGENCY INC., Shinjyuku-ku (JP)

(72) Inventors: Takashi Oyama, Suita (JP); Masaaki Kato, Tamano (JP); Yasuhiro Kotani, Hujisawa (JP)

(73) Assignee: WATER AGENCY INC., Tokyo (JP)

( * ) Notice: Subject to any disclaimer, the term of this patent is extended or adjusted under 35 U.S.C. 154(b) by 0 days.

(21) Appl. No.: 15/757,885

(22) PCT Filed: Sep. 6, 2016

(86) PCT No.: PCT/JP2016/076727
§ 371 (c)(1),
(2) Date: Mar. 6, 2018

(87) PCT Pub. No.: WO2017/043657
PCT Pub. Date: Mar. 16, 2017

(65) Prior Publication Data
US 2018/0334752 A1      Nov. 22, 2018

(30) Foreign Application Priority Data

Sep. 11, 2015   (JP) ................................. 2015-179200

(51) Int. Cl.
*C25B 9/18* (2006.01)
*C25B 1/04* (2006.01)
(Continued)

(52) U.S. Cl.
CPC .............. *C25B 1/13* (2013.01); *B01F 3/0446* (2013.01); *B01F 5/0062* (2013.01); *B01F 5/0065* (2013.01); *B01F 5/0071* (2013.01); *B01F 5/0689* (2013.01); *C02F 1/4672* (2013.01); *C25B 9/00* (2013.01); *C25B 9/04* (2013.01); *C25B 9/10* (2013.01); *C25B 11/03* (2013.01);
(Continued)

(58) Field of Classification Search
CPC .... C02F 1/46109; C02F 2303/04; C25B 9/18; C25B 9/00; C25B 1/04; C25B 9/06
USPC ......................................................... 204/269
See application file for complete search history.

(56) References Cited

FOREIGN PATENT DOCUMENTS

CN       102295326    * 12/2011   ............. C02F 1/461
JP       2008-189968 A   8/2008
(Continued)

*Primary Examiner* — Zulmariam Mendez
(74) *Attorney, Agent, or Firm* — R. Neil Sudol; Henry D. Coleman

(57) ABSTRACT

The present invention provides a set of ozone water manufacturing device which can greatly reduce an unpleasant smell of ozone gas when ozone water is used for sterilizing hands and feet, and can save power consumption of a pump which operates for preventing stagnation of a water stream in an electrolytic bath. The ozone water manufacturing device includes an electrolytic bath and a mixer which atomizes air bubbles of the ozone gas in the ozone water flowing out of the electrolytic bath. Each of the electrode assemblies in an electrode unit within the electrolytic bath is inclined at the predetermined same angle in a vertical direction. The mixer includes a mixing case bottom and a mixing case main body. A vortex flow generating plate generates a violent water stream from the water stream within the mixing case main body.

1 Claim, 9 Drawing Sheets

(51) Int. Cl.
*C25B 9/06* (2006.01)
*C25B 1/13* (2006.01)
*C25B 11/03* (2006.01)
*C25B 13/02* (2006.01)
*C25B 15/08* (2006.01)
*C25B 9/00* (2006.01)
*B01F 3/04* (2006.01)
*B01F 5/00* (2006.01)
*B01F 5/06* (2006.01)
*C25B 9/10* (2006.01)
*C02F 1/467* (2006.01)
*C25B 9/04* (2006.01)
*C02F 1/461* (2006.01)

(52) U.S. Cl.
CPC .............. *C25B 13/02* (2013.01); *C25B 15/08* (2013.01); *B01F 2215/008* (2013.01); *C02F 1/46109* (2013.01); *C02F 2001/46157* (2013.01); *C02F 2201/4618* (2013.01); *C02F 2201/46115* (2013.01); *C02F 2301/024* (2013.01); *C02F 2301/026* (2013.01); *Y02P 20/123* (2015.11)

(56) References Cited

FOREIGN PATENT DOCUMENTS

| | | |
|---|---|---|
| JP | 2014-117683 A | 6/2014 |
| JP | 2014-124601 A | 7/2014 |
| JP | 2014-201768 A | 10/2014 |

\* cited by examiner

OZONE WATER MANUFACTURING DEVICE

TECHNICAL FIELD

The present invention relates to an ozone water manufacturing device.

BACKGROUND ART

Ozone water is excellent in a bactericidal effect, and has been conventionally used for sterilization of hands and feet and of vegetables and tableware. Further, as one of means for manufacturing the ozone water, there has been used so far an electrochemical manufacturing device for performing electrolysis of water.

The ozone water has the excellent bactericidal effect as mentioned above. However, in the case where the ozone water is manufactured by the conventional electrochemical manufacturing device, the ozone water contains a large amount of air bubble of ozone gas which has a large particle diameter, and is generated during electrolysis. Further, since the ozone gas gives out a strong offensive smell, and has a strong uncomfortable feeling once the air bubbles are burst when the ozone gas is used for sterilizing the hands and feet.

Further, in the case of the conventional electrochemical manufacturing device where a tabular anode power feeding bar and a tabular cathode power feeding bar are vertically arranged in parallel with each other, particularly within a bottomed cylindrical vertical electrolysis tank case, and electrode assemblies in which an anode electrode and a cathode electrode having respectively a tabular shape are stacked therebetween with a cation exchange membrane, on which through holes having a desired dimension are pierced at the same position sandwiched therebetween, are arranged in parallel with one another at predetermined intervals in a vertical direction, the electrode assemblies positioned at the upper and lower sides are all in parallel with one another.

As a result, the electrochemical manufacturing device tends to cause stagnation of the water between the electrode assemblies at the upper and lower sides, and the air bubbles of the ozone gas generated in the electrode assemblies at the lower side stay between the electrode assemblies at the upper and lower sides, resulting in preventing dissipation of Joule heat. Further, when the temperature reaches high temperature above 40 to 50° C. consequently, a resin part in the periphery of the electrode assemblies may be deformed. Further, to avoid this unfavorable situation, it is necessary to operate at all times a pump to improve a flow of the water and promote the dissipation of the Joule heat. As a result, a considerable amount of power is required.

SUMMARY OF INVENTION

Technical Problem

The present invention is made in view of the above-mentioned problems, and an object of the present invention is to provide a set of ozone water manufacturing device including an electrolytic bath which electrolyzes the water, and a mixer which atomizes the air bubbles in the ozone gas in the ozone water flowing out of the electrolytic bath. This allows an unpleasant smell of the ozone gas to be greatly reduced when the ozone water is used for sterilizing the hands and feet. Further, all of the electrode assemblies within the electrolytic bath are inclined in the same direction, which enables the water and the ozone gas to be smoothly flowed without stagnating between the electrode assemblies at the upper and lower sides, thereby dissipating the Joule heat. This prevents the dissipation of the Joule heat from being blocked due to the stagnation of the air bubbles of the ozone gas as conventionally encountered, and saves power consumption required for an operation of the pump to promote the dissipation of the Joule heat.

Solution to Problem

Accordingly, the gist of the present invention lies in an ozone water manufacturing device having the following structure. An ozone water manufacturing device comprising: an electrolytic bath; and a mixer; the electrolytic bath including a bottomed cylindrical vertical electrolytic bath case, and an electrode unit; the electrode unit including electrode assemblies and an electrode support piece; the bottomed cylindrical vertical electrolytic bath case being provided at its lower side with a raw water inflow port, provided at its upper side with an ozone water outflow port, provided at its upper opening at the center of which through insertion tubes are arranged in parallel for upper ends of each of a tabular anode power feeding bar and a tabular cathode power feeding bar, and provided with a cap attached on an upper lid on which through insertion holes are formed at its center for upper ends of the tabular anode power feeding bar and the tabular cathode power feeding bar; the electrode assemblies including the tabular anode power feeding bar and the tabular cathode power feeding bar vertically arranged in parallel with each other within the electrolytic bath case, and an anode electrode and a cathode electrode which are arranged in parallel with one another at predetermined intervals in a vertical direction between the tabular anode power feeding bar and the tabular cathode power feeding bar, has respectively a tabular shape and on which through holes having a desired diameter are pierced through at the same position with a cation exchange membrane, on which through holes are pierced through at the same position, sandwiched and stacked therebetween; and the electrode support piece energizing the tabular anode power feeding bar and the tabular cathode power feeding bar, and the anode electrode and the cathode electrode, respectively and supporting the electrode assemblies; wherein each of the electrode assemblies in the electrode unit is inclined at the predetermined same angle in a vertical direction; the mixer including a bottomed cylindrical mixing case bottom, a vertically long mixing case main body, a plurality of vortex flow generating plates and a mixing collar; the bottomed cylindrical, mixing case bottom being provided with an ozone water inflow port at a position offset from a center line at the lower side, connecting the ozone water inflow port to an ozone water outflow port in the electrolytic bath via a pipe, and being provided with a cylindrical connection cap at its top; the vertically long cylindrical mixing case main body connecting its lower portion to the connection cap at the mixing case bottom, and being provided at its conical top with an ozone water outflow port; the plurality of vortex flow generating plates being accommodated within the mixing case main body with the plates vertically stacked, formed into a circular plate having a desired thickness and on which water passage holes are penetrated through at a plurality of positions at a portion closer to an outer periphery than the center, diagonally arranged with respect to a thickness direction, and tapered at the outflow side along a circumferential direction; and the cylindrical mixing collar having a desired diameter and length, formed into a circular plate between the vortex flow generating plates, and arranged with a partition plate, on which water passage holes having a desired diameter penetrated through at a plurality of positions along a thickness direction, sandwiched therebetween.

Effect of the Invention

In the present invention, as mentioned above, a set of ozone water manufacturing device is configured to include the electrolytic bath which electrolyzes the water, and the mixer which atomizes the air bubbles of the ozone gas in the ozone water flowing out of the electrolytic bath. As a result, the present invention allows the offensive smell of the ozone gas to be greatly reduced when the ozone water is used for sterilizing the hands and feet. Further, since all of the electrode assemblies within the electrolytic bath are inclined in the same direction, the present invention allows the water and the ozone gas to be smoothly flowed without stagnating between the electrode assemblies at the upper and lower sides, thereby enabling the dissipation of the Joule heat. Therefore, the present invention allows the dissipation of the joule heat to be prevented from being blocked due to the stagnation of the air bubbles of the ozone gas as encountered in the conventional structure, and saving the power consumption required for an operation of the pump to promote the dissipation of the Joule heat.

DESCRIPTION OF EMBODIMENT

Figure 1:
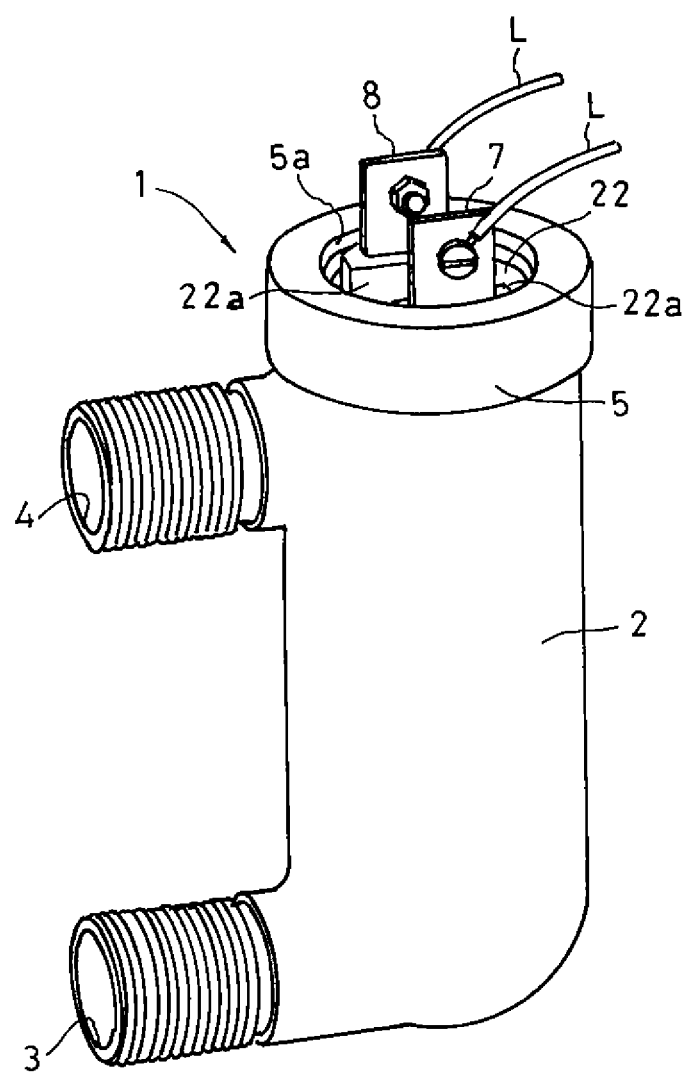
FIG. 1 is a perspective view of an electrolytic bath in an ozone water manufacturing device according to an embodiment of the present invention seen from a front side.
Figure 2:
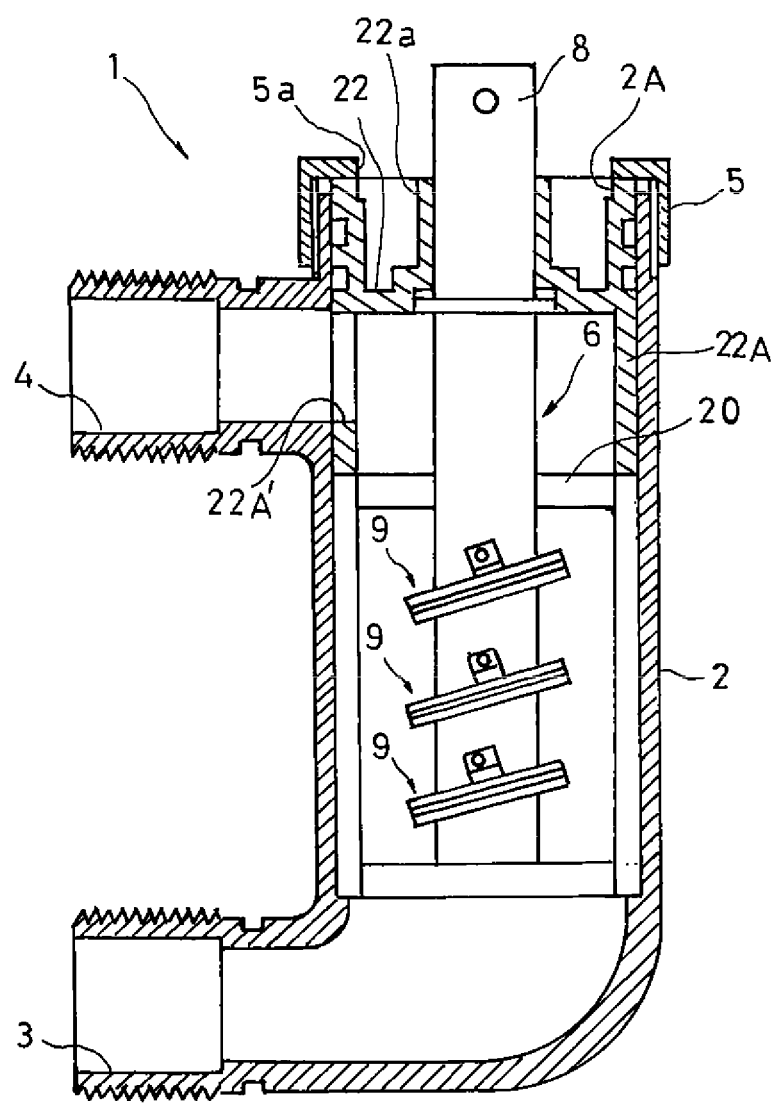
FIG. 2 is a longitudinal right side cross sectional view of the electrolytic bath.
Figure 3:
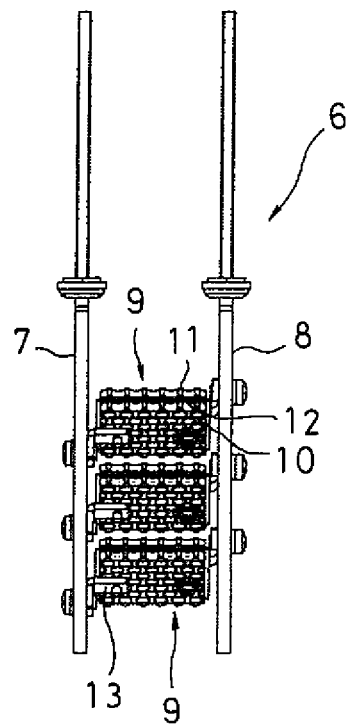
FIG. 3 is a rear view of an electrode unit of the electrolytic bath.
Figure 4:
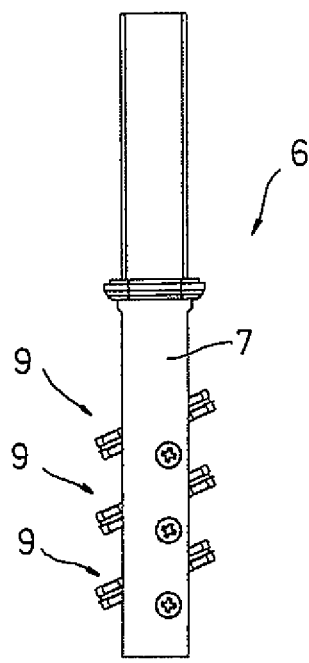
FIG. 4 is a right side view of the electrode unit of the electrolytic bath.
Figure 5:
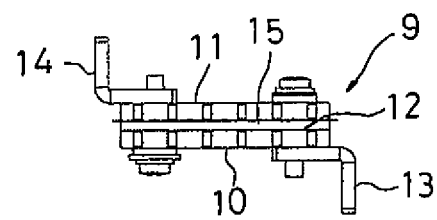
FIG. 5 is a front view of electrode assemblies and an electrode support piece of the electrolytic bath.
Figure 6:
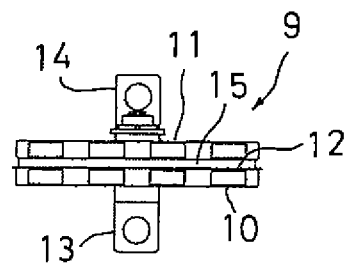
FIG. 6 is a right side view of the electrode assemblies and the electrode support piece of the electrolytic bath.
Figure 7:
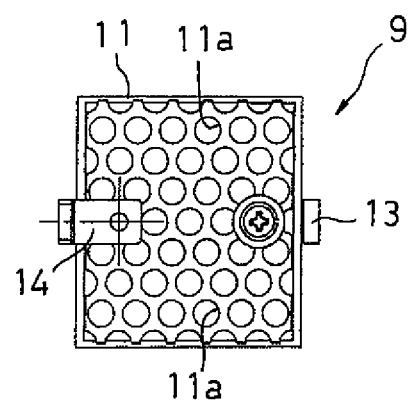
FIG. 7 is a plan view of the electrode assemblies and the electrode support piece of the electrolytic bath.
Figure 8:
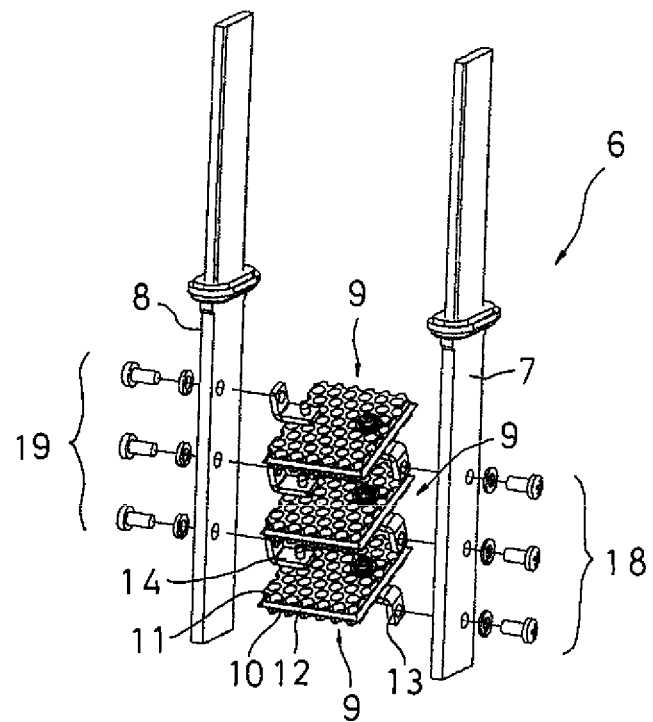
FIG. 8 is an exploded perspective view of the electrode unit of the electrolytic bath seen from the front side of the electrode unit.
Figure 9:
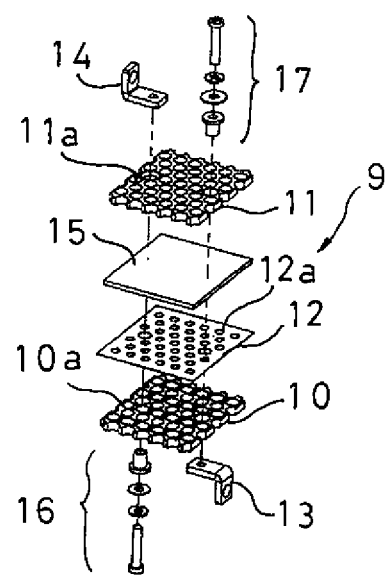
FIG. 9 is an exploded perspective view of the electrode assemblies and the electrode support piece of the electrolytic bath seen from the front side.
Figure 10:
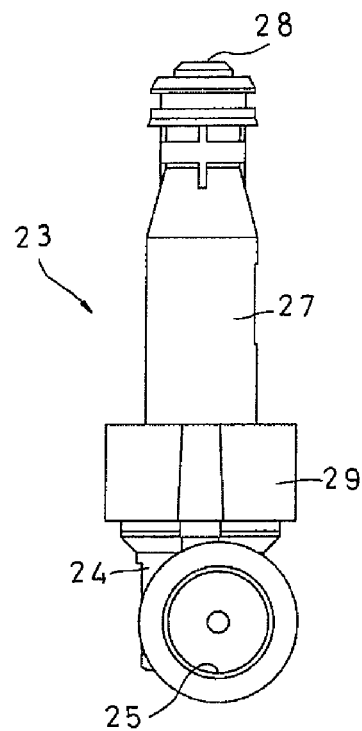
FIG. 10 is a front view of a mixer in the ozone water manufacturing device according to the embodiment of the present invention.
Figure 11:
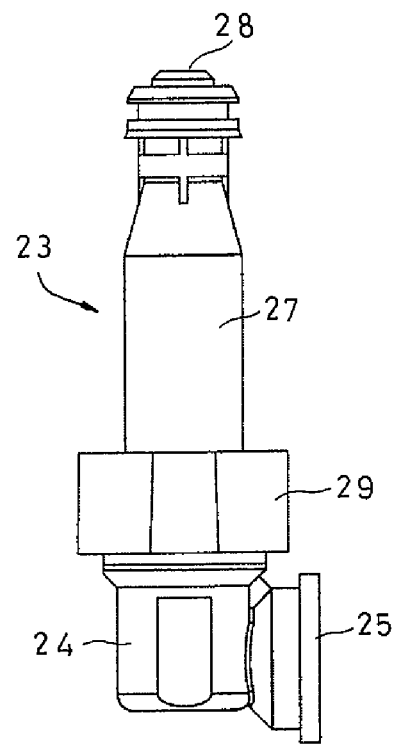
FIG. 11 is a left side view of the mixer.
Figure 12:
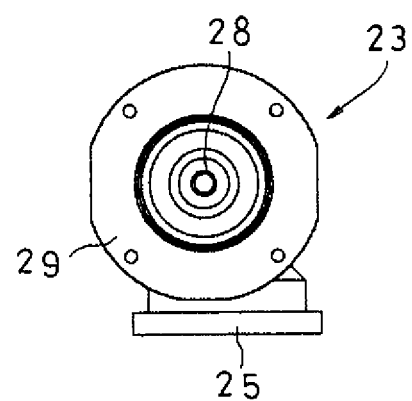
FIG. 12 is a plan view of the mixer.
Figure 13:
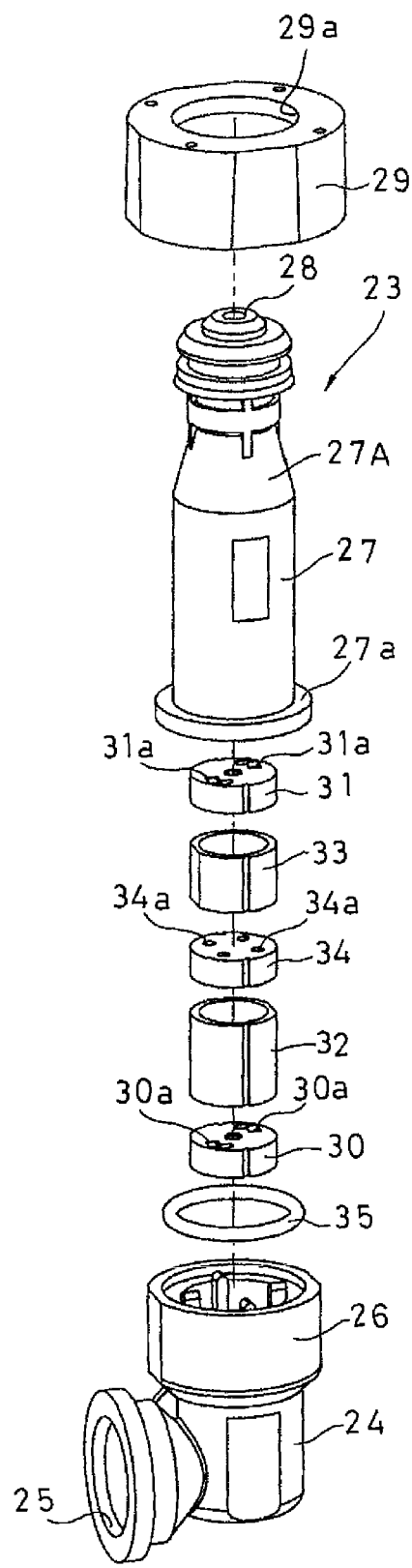
FIG. 13 is an exploded perspective view of the mixer seen from the front side.
Figure 14:
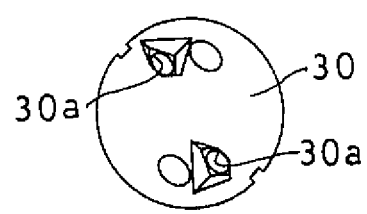
FIG. 14 is a bottom view of a vortex flow generating plate of the mixer.
Figure 15:
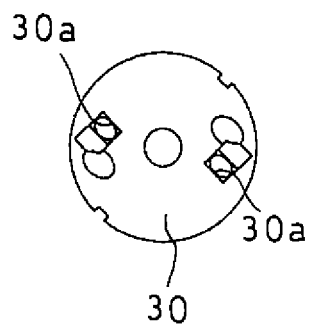
FIG. 15 is a plan view of the vortex flow generating plate of the mixer.

A description will be given below of an embodiment according to the present invention with reference to the accompanying drawings.

In the drawings, reference numeral 1 denotes an electrolytic bath which electrolyzes water, and composes a set of ozone water manufacturing device together with a mixer to be described later. Further, the electrolytic bath 1 includes an electrolytic bath case and an electrode unit to be described later.

Reference numeral 2 denotes a bottomed cylindrical vertical electrolytic bath case. The vertical electrolytic bath case 2 is provided at its lower side with a raw water inflow port 3 and at its upper side with an ozone water outflow port 4. Further, the vertical electrolytic bath case 2 includes a cap 5 which is attached on an upper opening 2A, and at the center of which a through insertion hole 5a is formed for upper ends of a tabular anode power feeding bar and a tabular cathode power feeding bar to be described later. An upper lid to be described later is provided at the upper opening 2A, and the cap 5 is attached thereon.

Reference numeral 6 denotes an electrode unit provided within the electrolytic bath case 2. The electrode unit 6 includes a tabular anode power feeding bar and a tabular cathode power feeding bar, as well as electrode assemblies and an electrode support piece to be described later.

Reference numerals 7 and 8 denote the tabular anode power feeding bar and the tabular cathode power feeding bar vertically arranged in parallel with each other within the electrolytic bath case 2. Reference numerals 9, 9 and 9 denote electrode assemblies arranged in parallel with one another at predetermined intervals in a vertical direction between the tabular anode power feeding bar 7 and the tabular cathode power feeding bar 8. Note that three electrode assemblies 9 are provided in the present embodiment, however, the number of the electrode assemblies may be appropriately determined. Further, each of the electrode assemblies has a tabular shape, and is configured by stacking an anode electrode 10 and a cathode electrode 11 on which through holes 10a and 11a having a desired diameter are pierced at the same position with a cation exchange membrane 12, on which a through hole 12a is pierced at the same position, sandwiched therebetween.

Reference numerals 13 and 14 denote the electrode support pieces which energize the tabular anode power feeding bar 7 and the tabular cathode power feeding bar 8, and the anode electrode 10 and the cathode electrode 11, respectively, and support the electrode assemblies 9. Further, reference numeral 15 denotes a sintering plate positioned between the cathode electrode 11 and the cation exchange membrane 12 with the plate sandwiched between the anode electrode 11 and the cation exchange membrane 12. Reference numerals 16 and 17 denote connecting fittings connecting the electrode support pieces 13 and 14 to the electrode assemblies 9, respectively. Reference numerals 18 and 19 denote connecting fittings connecting each of the electrode support pieces 13 and 14 to the tabular anode power feeding bar 7 and the tabular cathode power feeding bar 8, respectively Reference numerals 20 and 21 denote support frames which vertically hold the tabular anode power feeding bar 7 and the tabular, cathode power feeding bar 8 within the electrolytic bath case 2. Here, illustration of one support frame 21 is not shown. Reference numeral 22 denotes an upper lid of the electrolytic bath case 2 at the center of which through tubes 22a are arranged in parallel for upper ends of each of the tabular anode power feeding bar 7 and the tabular cathode power feeding bar 8. Here, in the present embodiment, the upper lid 22 is integrated with a cylindrical support 22A at a lower portion, and is formed with a communication hole 22A' communicating with the water outflow port 4 at the side of the support 22A.

Accordingly, in the present embodiment, each of the electrode assemblies 9, 9 and 9 in the electrode unit 6 is inclined at the predetermined same angle in a vertical direction.

Reference numeral 23 denotes a mixer which atomizes air bubbles of the ozone gas in the ozone water flowing out of the electrolytic bath 1. The mixer 23 composes a set of ozone water manufacturing device together with the electrolytic bath 1. Further, the mixer 23 includes a mixing case bottom, a mixing case main body, a vortex flow generating plate, a partition plate and a mixing collar to be described later.

Reference numeral 24 denotes a bottomed cylindrical mixing case bottom. Further, the mixing case bottom 24 is provided with an ozone water inflow port 25 at a position offset from a center line at the lower side, configured such that the ozone water inflow port 25 is connected to the ozone water outflow port 4 in the electrolytic bath 1 via a pipe (not shown), and provided at its top with a cylindrical connection cap 26.

Reference numeral 27 denotes a vertically long cylindrical mixing case main body which fits and connects a flange 27a at a lower portion thereof to the connection cap 26 of the mixing case bottom 24. Further, the mixing case main body 27 is provided at a conical top 27A thereof with an ozone water outflow port 28. Reference numeral 29 denotes a fixing cap which is attached to the connection cap 26 of the mixing case bottom 24 with the mixing case main body 27 inserted into a hole 29a at the center.

Reference numerals 30 and 31 denote vortex flow generating plates accommodated within the mixing case main body 27 with the plates 30 and 31a vertically stacked therein. Further, each of the vortex flow generating plates 30 and 31 which is formed into a circular plate having a desired thickness, and on which water passage holes 30a and 31a are penetrated through at a plurality of positions (two in the present embodiment) at a portion closer to an outer periphery than the center, diagonally arranged with respect to a thickness direction thereof, and is tapered at the outflow side along a circumferential direction.

Reference numerals 32 and 33 denote cylindrical mixing collars having a desired diameter and length. Further, each of the mixing collars 32 and 33 is formed into a circular plate having a desired diameter between the vortex flow generating plates 30 and 31, and arranged with a partition plate 34, on which water passage holes 34a having a desired diameter is penetrated through at a plurality of positions along a thickness direction thereof, sandwiched therebetween. Further, reference numeral 35 denotes an O-ring interposed between the connection cap 26 of the mixing case bottom 24 and the flange 27a of the mixing case main body 27.

Next, a description will be given of an operation exerted by the above-mentioned embodiment.

A description will be first given of the electrolysis of the water in the electrolytic bath 1. An electric power is fed by connecting each of the tabular anode feeding bar 7 and the tabular cathode power feeding bar 8 protruding from the through hole 5a of the cap 5 to a power supply (not shown) via a conducting wire L. As a result, the raw water flowing into the electrolytic bath 1 from the raw water inflow port 3 is electrolyzed by each of the electrode assemblies 9, 9 and 9. Further, the water containing the air bubbles of the ozone gas generated at that time smoothly passes through between the respective electrode assemblies 9, 9 and 9 without stagnating therebetween since all of the electrode assemblies 9, 9 and 9 are inclined at the predetermined same angle in the vertical direction. Therefore, the air bubbles of the ozone gas do not stay between the respective electrode assemblies 9, 9 and 9. After that, the air bubbles of the ozone gas flow out of the ozone water outflow port 4, and are supplied to the mixer 23 via the pipe (not shown).

The water fed out of the electrolytic bath 1 and containing the air bubbles of the ozone gas flows into from the ozone water inflow port 25 of the mixing case bottom 24. However, since the ozone water inflow port 25 is provided at the position offset from the center line at the lower side of the mixing case bottom 24, the water goes up as a flow in a circumferential direction along an inner wall of the mixing case bottom 24. Then, the water flows into the cylindrical mixing collar 32 positioned at an upper position thereof through the water passage holes 30a and 30a of the vortex flow generating plate 30 positioned at a lower position of the water passage holes 30a and 30a. Since the water passage holes 30a and 30a of the vortex flow generating plate 30 are formed diagonally with respect to the thickness direction and along the circumferential direction, the water stream flows at this time as the vortex flow within the cylindrical mixing collar 32. Further, since the water passage holes 30a and 30a of the vortex flow generating plate 30 are inclined along the water stream in the circumferential direction along the inner wall of the mixing case bottom 24 and are tapered at the outflow side, the flow speed is increased when the water stream flows out of the water passage holes 30a and 30a. As a result, the water within the cylindrical mixing collar flows as a violent vortex flow, the air bubbles of the ozone gas contained in the water are sheared by the vortex flow and are atomized consequently. Further, the air bubbles of the ozone gas are sheared again in the same manner by the vortex flow generating plate 31 positioned at the upper position, and thereafter flow out of the ozone water outflow port 28 of the mixing case main body 27.

REFERENCE SIGNS LIST 1 electrolytic bath
2 electrolytic bath case
2A upper opening of electrolytic bath case
3 raw water inflow port
4 ozone water outflow port
5 cap
6 electrode unit
7 tabular anode power feeding bar
8 tabular cathode power feeding bar
9, 9 electrode assemblies
10 anode electrode
11 cathode electrode
12 cation exchange membrane
13, 14 electrode support piece
20, 21 support frame
22 upper lid
23 mixer
24 mixing case bottom
25 ozone water inflow port
26 connection cap
27 mixing case main body
28 ozone water outflow port
29 fixing cap
30, 31 vortex flow generating plate
30a, 31a water passage hole
32, 33 mixing collar
34 partition plate

The invention claimed is:

1. An ozone water manufacturing device comprising:
an electrolytic bath; and
a mixer;
the electrolytic bath including a bottomed cylindrical vertical electrolytic bath case, and an electrode unit;
the electrode unit including electrode assemblies and an electrode support piece;
the bottomed cylindrical vertical electrolytic bath case being provided at its lower side with a raw water inflow port, provided at its upper side with an ozone water outflow port, provided at its upper opening at the center of which through insertion tubes are arranged in parallel for upper ends of each of a tabular anode power feeding bar and a tabular cathode power feeding bar, and provided with a cap attached on an upper lid on which through insertion holes are formed at its center for upper ends of the tabular anode power feeding bar and the tabular cathode power feeding bar;
the electrode assemblies including the tabular anode power feeding bar and the tabular cathode power feeding bar vertically arranged in parallel with each other within the electrolytic bath case, and an anode electrode and a cathode electrode which are arranged in parallel with one another at predetermined intervals in a vertical direction between the tabular anode power feeding bar and the tabular cathode power feeding bar, has respectively a tabular shape and on which through holes having a desired diameter are pierced through at the same position with a cation exchange membrane, on which through holes are pierced through at the same position, sandwiched and stacked therebetween; and
the electrode support piece energizing the tabular anode power feeding bar and the tabular cathode power feeding bar, and the anode electrode and the cathode electrode, respectively and supporting the electrode assemblies;
wherein each of the electrode assemblies in the electrode unit is inclined at the predetermined same angle in a vertical direction;
the mixer including a bottomed cylindrical mixing case bottom, a vertically long mixing case main body, a plurality of vortex flow generating plates and a mixing collar;
the bottomed cylindrical mixing case bottom being provided with an ozone water inflow port at a position offset from a center line at the lower side, connecting the ozone water inflow port to an ozone water outflow port in the electrolytic bath via a pipe, and being provided with a cylindrical connection cap at its top;
the vertically long cylindrical mixing case main body connecting its lower portion to the connection cap at the mixing case bottom, and being provided at its conical top with an ozone water outflow port;
the plurality of vortex flow generating plates being accommodated within the mixing case main body with the plates vertically stacked, formed into a circular plate having a desired thickness and on which water passage holes are penetrated through at a plurality of positions at a portion closer to an outer periphery than the center, diagonally arranged with respect to a thickness direction, and tapered at the outflow side along a circumferential direction; and
the cylindrical mixing collar having a desired diameter and length, formed into a circular plate between the vortex flow generating plates, and arranged with a partition plate, on which water passage holes having a desired diameter penetrated through at a plurality of positions along a thickness direction, sandwiched therebetween.

* * * * *